United States Patent
Hou et al.

(10) Patent No.: US 12,306,507 B2
(45) Date of Patent: *May 20, 2025

(54) ARRAY SUBSTRATE AND MANUFACTURING METHOD THEREOF, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Wenjie Hou, Beijing (CN); Yingmeng Miao, Beijing (CN); Qiujie Su, Beijing (CN); Chongyang Zhao, Beijing (CN); Feng Qu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,819

(22) Filed: Jan. 29, 2024

(65) Prior Publication Data

US 2024/0168348 A1    May 23, 2024

Related U.S. Application Data

(63) Continuation of application No. 17/792,264, filed as application No. PCT/CN2021/115955 on Sep. 1, 2021, now Pat. No. 11,921,388.

(30) Foreign Application Priority Data

Oct. 30, 2020   (CN) .......................... 202011189386.7

(51) Int. Cl.
   *G02F 1/1362*        (2006.01)

(52) U.S. Cl.
   CPC .. *G02F 1/136286* (2013.01); *G02F 1/136209* (2013.01); *G02F 1/136222* (2021.01)

(58) Field of Classification Search
   CPC ......... G02F 1/136286; G02F 1/136222; G02F 1/136209; G02F 1/136277; G02F 1/155;
   (Continued)

(56) References Cited

U.S. PATENT DOCUMENTS

2004/0227889 A1   11/2004   Kim
2007/0072323 A1    3/2007   Kim
(Continued)

FOREIGN PATENT DOCUMENTS

CN        101382708 A       3/2009
CN        102033365 A       4/2011
(Continued)

OTHER PUBLICATIONS

International Search Report dated Oct. 30, 2020 for PCT/CN2021/115955.
(Continued)

*Primary Examiner* — Hoan C Nguyen
(74) *Attorney, Agent, or Firm* — The Webb Law Firm

(57) ABSTRACT

Provided are an array substrate and a manufacturing method thereof, and a display device. The array substrate includes a plurality of data lines and sub-pixels. At least one sub-pixel includes: a first insulating layer; a gate; an active layer located on one side of the first insulating layer away from the gate; a pixel electrode; a first electrode located connected to the active layer and in contact with the pixel electrode; a second electrode connected to the active layer and a data line; a second insulating layer having a first opening, wherein the orthographic projection of the first opening partially overlaps with the orthographic projections of the pixel electrode and the first electrode; a connection electrode (Continued)

in contact with the pixel electrode and the first electrode through the first opening; and a common electrode located on one side of the second insulating layer away from the pixel electrode.

20 Claims, 7 Drawing Sheets

(58) Field of Classification Search
CPC .......... G02F 2001/1555; G02F 1/1676; G02F 1/16761; G02F 1/16762; G02F 1/16766; G02F 1/134372; G02F 1/13394; G02F 1/136213; G02F 1/133707; G02F 1/1362; G02F 1/134309; G02F 1/1333; G02F 1/133345; G02F 1/133512; G02F 1/133514; G02F 1/134363; G02F 1/13439; G02F 1/136227; G02F 1/1368; G02F 2001/13606; G02F 2001/13629; G02F 1/13629; G09G 3/3677; G09G 2310/0286; H01L 27/12; H01L 27/1214; H01L 27/124; H01L 27/13
See application file for complete search history.

(56) References Cited

U.S. PATENT DOCUMENTS

| | | |
|---|---|---|
| 2007/0153201 A1 | 7/2007 | Lee et al. |
| 2009/0059110 A1 | 3/2009 | Sasaki et al. |
| 2011/0085121 A1 | 4/2011 | Jeon et al. |
| 2013/0140712 A1 | 6/2013 | Chen |
| 2014/0022478 A1 | 1/2014 | Kim et al. |
| 2014/0055478 A1 | 2/2014 | Thakkar et al. |
| 2014/0339563 A1 | 11/2014 | Huang et al. |
| 2015/0060858 A1* | 3/2015 | Funahashi ......... G02F 1/136286 257/89 |
| 2015/0243229 A1* | 8/2015 | Jung ................... G09G 3/3688 345/690 |
| 2015/0364494 A1 | 12/2015 | Cheng et al. |
| 2016/0254275 A1* | 9/2016 | Feng ........................ H01L 33/42 257/72 |
| 2017/0082881 A1 | 3/2017 | Wang et al. |
| 2018/0053786 A1 | 2/2018 | Sun |
| 2018/0233518 A1* | 8/2018 | Qing ................. G02F 1/136286 |
| 2018/0341158 A1* | 11/2018 | Wang ..................... H01L 21/77 |
| 2019/0056609 A1 | 2/2019 | Kim |

FOREIGN PATENT DOCUMENTS

| | | |
|---|---|---|
| CN | 102402090 A | 4/2012 |
| CN | 103365012 A | 10/2013 |
| CN | 103413810 A | 11/2013 |
| CN | 104216183 A | 12/2014 |
| CN | 104280951 A | 1/2015 |
| CN | 105204252 A | 12/2015 |
| CN | 105528964 A | 4/2016 |
| CN | 105552028 A | 5/2016 |
| CN | 105679763 A | 6/2016 |
| CN | 106298809 A | 1/2017 |
| CN | 107991796 A | 5/2018 |
| CN | 110515244 A | 11/2019 |

OTHER PUBLICATIONS

Office Action dated Apr. 20, 2023 from U.S. Appl. No. 17/792,264.
Office Action dated Aug. 3, 2023 from U.S. Appl. No. 17/792,264.
Notice of Allowance dated Oct. 31, 2023 from U.S. Appl. No. 17/792,264.
Notice dated Nov. 20, 2023 from U.S. Appl. No. 17/792,264.
International Search Report and Written Opinion dated Dec. 6, 2021 for PCT/CN2021/115955.

* cited by examiner

ARRAY SUBSTRATE AND MANUFACTURING METHOD THEREOF, AND DISPLAY DEVICE

CROSS-REFERENCE TO RELATED APPLICATIONS

The present disclosure is a continuation of U.S. application Ser. No. 17/792,264, filed Sep. 1, 2021, which is a U.S. National Stage Application under 35 U.S.C. § 371 of International Patent Application No. PCT/CN2021/115955, filed on Sep. 1, 2021, which is based on and claims priority to China Patent Application No. 202011189386.7 filed on Oct. 30, 2020, the disclosures of which are incorporated by reference herein in their entireties.

TECHNICAL FIELD

The present disclosure relates to an array substrate and a manufacturing method thereof, and a display device.

BACKGROUND

With the rapid development of display technology, the requirement for the resolution of a liquid crystal display device, for example a television, is raised, the liquid crystal display device of 8K resolution gradually becomes a research hotspot.

With the improvement of the resolution of the liquid crystal display device, the liquid crystal display device has an increased number of sub-pixels, and a downsized single sub-pixel.

SUMMARY

According to one aspect of the embodiments of the present disclosure, an array substrate is provided. The array substrate comprises a first base substrate, a plurality of data lines, and a plurality of sub-pixels connected to the plurality of data lines, at least one of the plurality of sub-pixels comprising: a first insulating layer located on one side of the first base substrate; a gate located between the first base substrate and the first insulating layer; an active layer located on one side of the first insulating layer away from the gate; a pixel electrode located on one side of the first insulating layer away from the first base substrate; a first electrode located on one side of the active layer and the pixel electrode away from the first base substrate, wherein the first electrode is connected to the active layer and in contact with the pixel electrode; a second electrode spaced apart from the first electrode, and connected to the active layer and a data line of the plurality of data lines; a second insulating layer located on one side of the pixel electrode, the first electrode and the second electrode away from the first base substrate, and defining a first opening, wherein an orthographic projection of the first opening on the first base substrate partially overlaps with an orthographic projection of the pixel electrode on the first base substrate, and partially overlaps with an orthographic projection of the first electrode on the first base substrate; a connection electrode in contact with the pixel electrode and the first electrode through the first opening; and a common electrode located on one side of the second insulating layer away from the pixel electrode and spaced apart from the connection electrode.

In some embodiments, common electrodes of a part of the plurality of sub-pixels are connected to each other, and common electrodes of remaining sub-pixels of the plurality of sub-pixels are spaced apart from each other.

In some embodiments, the plurality of sub-pixels comprises a plurality of columns of sub-pixels, the part of the sub-pixels comprises at least one column of sub-pixels of the plurality of columns of sub-pixels, each column of sub-pixels of the at least one column of sub-pixels comprises two adjacent sub-pixels, and two common electrodes of the two adjacent sub-pixels are connected through a common electrode connector.

In some embodiments, the plurality of sub-pixels comprises a plurality of rows of sub-pixels, and two gates of two adjacent sub-pixels in each row of sub-pixels of the plurality of rows of sub-pixels are connected through a gate connector, wherein the gate connector partially overlaps with the common electrode connector and the data line.

In some embodiments, the data line extends in a first direction and comprises: a first data line portion not overlapping with the gate connector; and a second data line portion adjacent to the first data line portion and partially overlapping with the gate connector, wherein a length of the second data line portion in a second direction perpendicular to the first direction is greater than a length of the first data line portion in the second direction.

In some embodiments, an angle between an extending direction of the gate connector and the first direction is greater than or equal to 45 degrees and smaller than 90 degrees.

In some embodiments, a ratio of the length of the second data line portion in the second direction to the length of the first data line portion in the second direction is greater than 1 and smaller than or equal to 1.4.

In some embodiments, the plurality of columns of sub-pixels comprises a plurality of columns of first sub-pixels configured to emit light of a first color, a plurality of columns of second sub-pixels configured to emit light of a second color, and a plurality of columns of third sub-pixels configured to emit light of a third color, two adjacent columns of third sub-pixels of the plurality of columns of third sub-pixels are spaced apart by one column of first sub-pixels of the plurality of columns of first sub-pixels and one column of second sub-pixels of the plurality of columns of second sub-pixels, and the first color, the second color and the third color are different from each other; and the at least one column of sub-pixels comprises two or more columns of third sub-pixels of the plurality of columns of third sub-pixels.

In some embodiments, two adjacent rows of third sub-pixels in the two or more rows of third sub-pixels are spaced apart by one column of third sub-pixels other than the two or more columns of third sub-pixels of the plurality of columns of third sub-pixels.

In some embodiments, the two common electrodes are integrally provided with the common electrode connector.

In some embodiments, the plurality of sub-pixels comprises a plurality of rows of sub-pixels; and the array substrate further comprises a plurality of common voltage lines connected to the plurality of rows of sub-pixels, and each of the plurality of common voltage lines is configured to apply a common voltage to common electrodes of a corresponding row of sub-pixels of the plurality of rows of sub-pixels.

In some embodiments, the array substrate further comprises: a first alignment layer located on one side of the common electrode away from the first base substrate; the second insulating layer of each sub-pixel in each row of sub-pixels of the plurality of rows of sub-pixels defines a second opening; and the common electrode of each sub-pixel in each row of sub-pixels is in contact with a common voltage line of the plurality of common voltage lines corresponding to each row of sub-pixels and in contact with the first base substrate through the second opening.

In some embodiments, the common voltage line comprises a first common voltage line portion, a second common voltage line portion and a third common voltage line portion, the third common voltage line portion is located between the first common voltage line portion and the second common voltage line portion, the third common voltage line portion is adjacent to the first common voltage line portion and the second common voltage line portion respectively, a length of the second common voltage line portion in a first direction perpendicular to a second direction in which the common voltage line extends is greater than a length of the first common voltage line portion in the first direction, and the length of the first common voltage line portion in the first direction is greater than a length of the third common voltage line portion in the first direction; and the common electrode of each sub-pixel in each row of sub-pixels is in contact with the second common voltage line portion through the second opening.

In some embodiments, the plurality of common voltage lines and the gate are located in a same layer.

In some embodiments, the common electrode and the connection electrode are located in a same layer.

In some embodiments, the common electrode comprises: a first electrode portion having a slit, the first electrode portion being located on one side of the connection electrode away from the gate; and a second electrode portion adjacent to the first electrode portion and not having a slit, the second electrode portion being located on one side of the connection electrode away from the data line.

According to another aspect of the embodiments of the present disclosure, provided is a display device, comprising the array substrate according to any one of the above embodiments.

In some embodiments, the display device further comprises a color filter substrate arranged opposite to the array substrate, the color filter substrate comprising: a second base substrate; a black matrix and a light filter layer which are located on one side of the second base substrate close to the array substrate, wherein the light filter layer comprises a plurality of light filter units, and adjacent light filter units of the plurality of light filter units are spaced apart by the black matrix; a planarization layer located on one side of the black matrix and the light filter layer close to the array substrate; and a plurality of spacers located between the planarization layer and the array substrate, wherein an orthographic projection of each of the plurality of spacers on the second base substrate is located within an orthographic projection of the black matrix on the second base substrate.

In some embodiments, the plurality of sub-pixels comprises a plurality of columns of first sub-pixels configured to emit light of a first color, a plurality of columns of second sub-pixels configured to emit light of a second color, and a plurality of columns of third sub-pixels configured to emit light of a third color, two adjacent columns of second sub-pixels of the plurality of columns of second sub-pixels are spaced apart by one column of first sub-pixels of the plurality of columns of first sub-pixels and one column of third sub-pixels of the plurality of columns of third sub-pixels, and the first color, the second color and the third color are different from each other; and the plurality of spacers comprises a plurality of columns of spacers corresponding to the plurality of columns of second sub-pixels, an orthographic projection of each spacer in each column of spacers of the plurality of columns of spacers on the first base substrate is a first projection, an orthographic projection of the gate of a second sub-pixel in one column of second sub-pixels of the plurality of rows of second sub-pixels corresponding to the each column of spacers on the first base substrate is a second projection, an orthographic projection of the active layer of the second sub-pixel on the first substrate is a third projection, and an orthographic projection of the data line connected to the second sub-pixel on the first base substrate is a fourth projection, wherein the first projection is located within the second projection, and located on one side of the third projection away from the fourth projection.

In some embodiments, the second color is red.

In some embodiments, a region of each first sub-pixel of the plurality of columns of first sub-pixels, a region of each second sub-pixel of the plurality of columns of second sub-pixels and a region of each third sub-pixel of the plurality of columns of third sub-pixels not covered by the black matrix each is a light-emitting region, and an area of the light-emitting region of each second sub-pixel is smaller than an area of the light-emitting region of each first sub-pixel and an area of the light-emitting region of each third sub-pixel.

In some embodiments, the second sub-pixel further comprises a plurality of blocking portions, and an orthographic projection of each of the plurality of blocking portions is located within the orthographic projection of the black matrix on the first base substrate, the plurality of blocking portions comprising: a first blocking portion located on one side of one of the plurality of spacers corresponding to the second sub-pixel close to the pixel electrode; and a second blocking portion located on one side of the first blocking portion away from the one of the plurality of spacers, wherein a height of the second blocking portion is greater than a height of the first blocking portion.

In some embodiments, a region of the second sub-pixel not covered by the black matrix is a light-emitting region; the first blocking portion and the second blocking portion are located on a first side of the light-emitting region; and the plurality of blocking portions further comprises a third blocking portion located on a second side of the light-emitting region, wherein the second side is opposite to the first side.

In some embodiments, the first blocking portion comprises a first layer, a second layer, a third layer, a fourth layer and a fifth layer sequentially arranged on the one side of the first base substrate; at least one of the second blocking portion or the third blocking portion comprises a sixth layer, a seventh layer, an eighth layer, a ninth layer, a tenth layer and an eleventh layer sequentially arranged on the one side of the first base substrate; and the first layer, the seventh layer and the first insulating layer are located in a same layer, the second layer, the eighth layer and the pixel electrode are located in a same layer, the third layer, the ninth layer and the first electrode are located in a same layer, the fourth layer, the tenth layer and the second insulating layer are located in a same layer, the fifth layer, the eleventh layer and the common electrode are located in a same layer, and the sixth layer and the gate are located in a same layer.

According to still another aspect of the embodiments of the present disclosure, provided is a manufacturing method of an array substrate, comprising forming a plurality of data lines and a plurality of sub-pixels on one side of a first base substrate, wherein forming at least one of the plurality of sub-pixels comprises: forming a gate on the one side of the first base substrate; forming a first insulating layer on one side of the gate away from the first base substrate; forming an active layer on one side of the first insulating layer away from the gate; forming a pixel electrode on one side of the first insulating layer away from the first base substrate; forming a first electrode and a second electrode, wherein the first electrode is located on one side of the active layer and the pixel electrode away from the first base substrate, connected to the active layer, and in contact with the pixel electrode, and the second electrode is spaced apart from the first electrode and connected to the active layer and a data line of the plurality of data line; forming a second insulating layer on one side of the pixel electrode, the first electrode and the second electrode away from the first base substrate, wherein the second insulating layer defines a first opening, an orthographic projection of the first opening on the first base substrate partially overlaps with an orthographic projection of the pixel electrode on the first base substrate, and partially overlaps with an orthographic projection of the first electrode on the first base substrate; and forming a connection electrode and a common electrode spaced apart from the connection electrode, wherein the connection electrode is in contact with the pixel electrode and the first electrode through the first opening, and the common electrode is located on one side of the second insulating layer away from the pixel electrode.

In some embodiments, forming the second insulating layer comprises: forming an insulating material layer covering the pixel electrode, the first electrode and the second electrode; forming a mask with a third opening on one side of the insulating material layer away from the first base substrate; and patterning the insulating material layer using the mask to obtain the second insulating layer.

Other features, aspects and advantages of the present disclosure will become apparent from the following detailed description of exemplary embodiments of the present disclosure with reference to the accompanying drawings.

BRIEF DESCRIPTION OF THE ACCOMPANYING DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

Figure 1A:
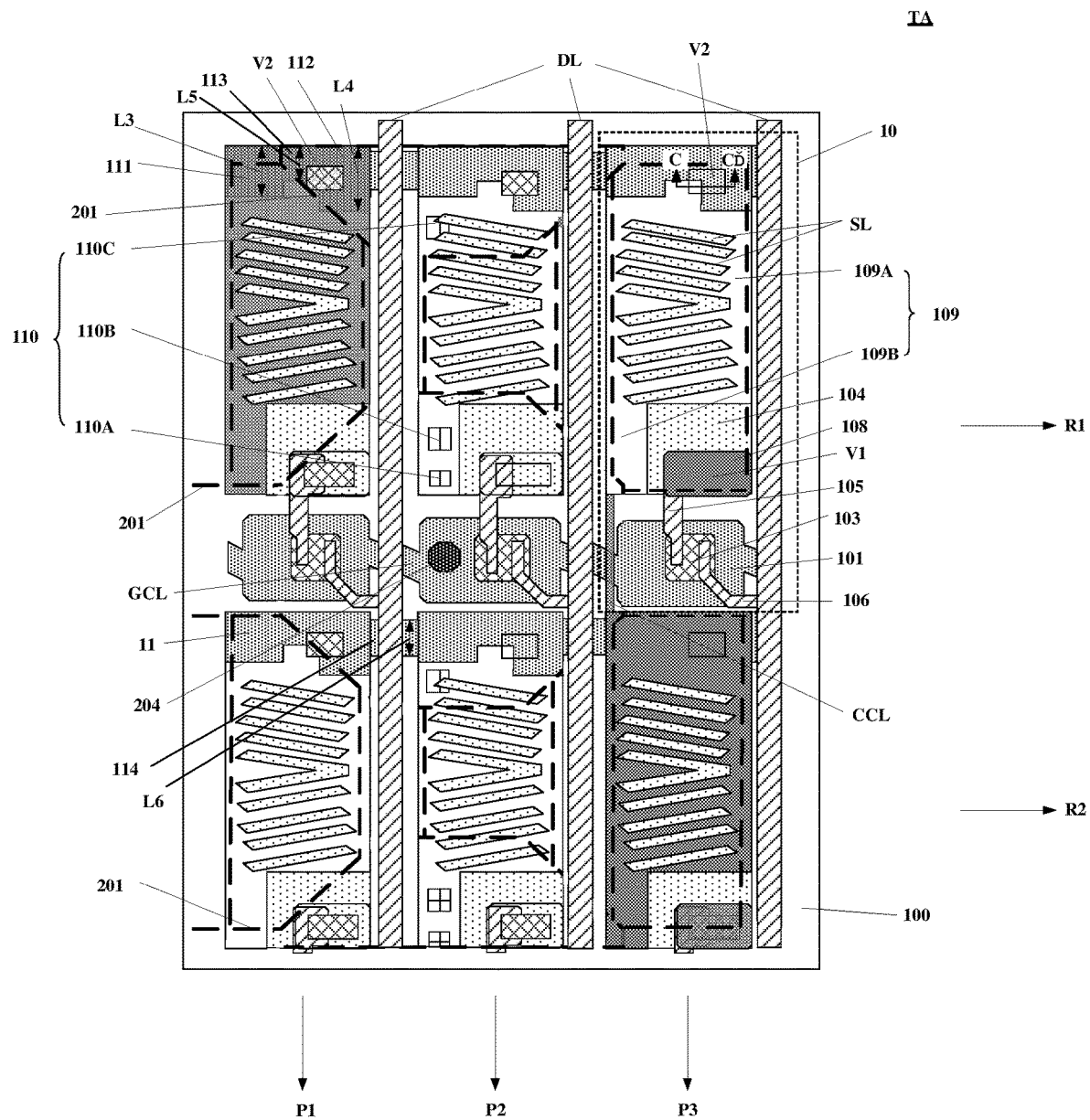
FIG. 1A is a schematic structural view showing an array substrate according to an embodiment of the present disclosure.

It should be understood that the dimensions of various parts shown in the accompanying drawings are not necessarily drawn according to actual proportional relations. In addition, the same or similar components are denoted by the same or similar reference signs.

DETAILED DESCRIPTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity, or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The inventors have noticed that, as a sub-pixel is downsized, the sub-pixel has a reduced storage capacitance, which results in that the sub-pixel tends to be subjected to interference by a leakage current of a thin film transistor in the sub-pixel and a capacitive coupling effect between the sub-pixel and a data line, thereby producing vertical crosstalk.

FIG. 1A is a schematic structural view showing an array substrate according to an embodiment of the present disclosure.

As shown in FIG. 1A, the array substrate TA comprises a first base substrate 100, a plurality of data lines DL, and a plurality of sub-pixels 10 connected to the plurality of data lines DL. For example, the sub-pixels 10 connected to a same data line DL of the plurality of sub-pixels 10 are located on a same side of the data line DL, that is, a same column of sub-pixels 10 are connected to a same data line DL.

Figure 1B:
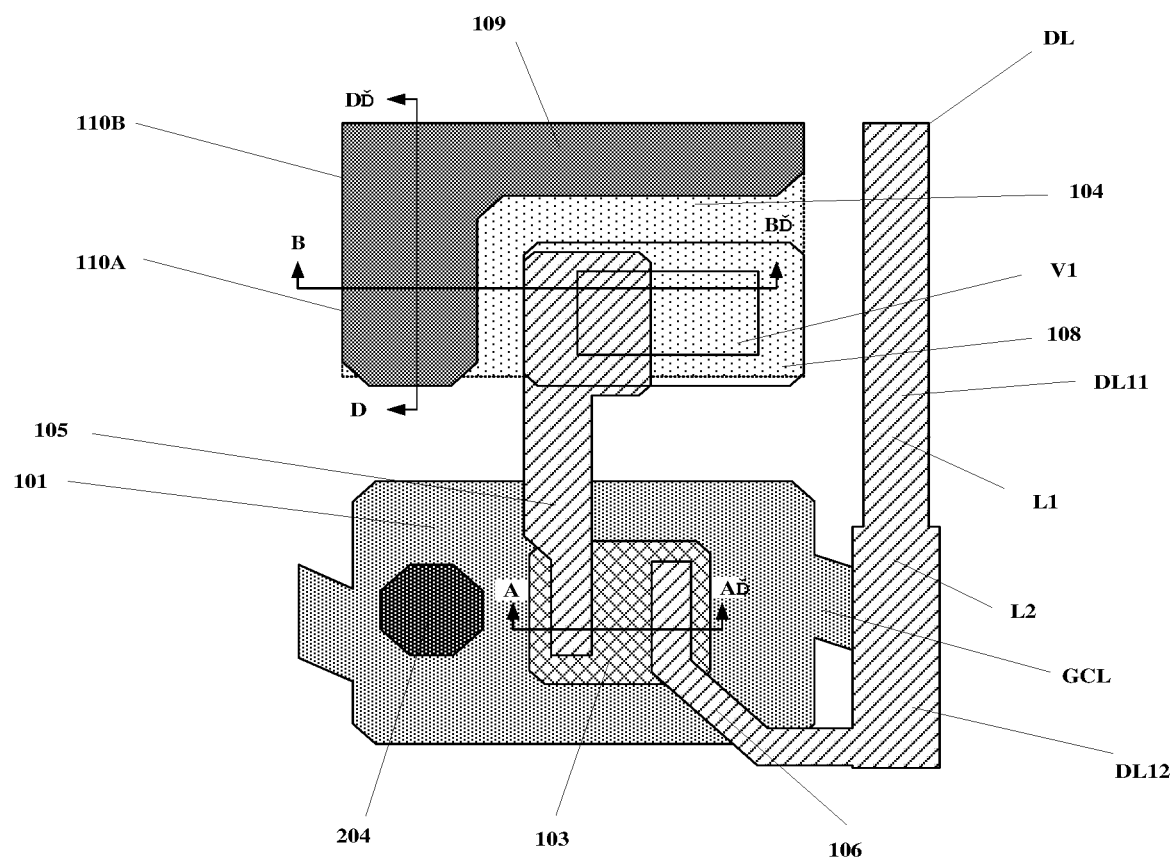
FIG. 1B is a partially enlarged schematic view showing the array substrate shown in FIG. 1A.
Figure 2A:
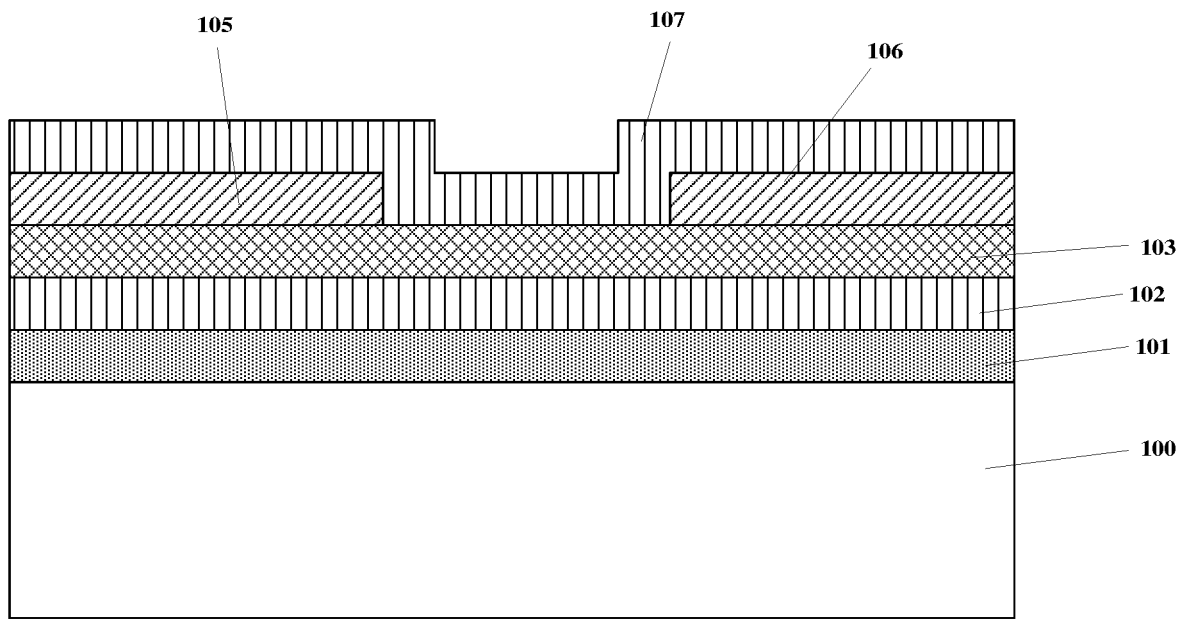
FIG. 2A is a schematic cross-sectional view taken along A-A' shown in FIG. 1B.
Figure 2B:
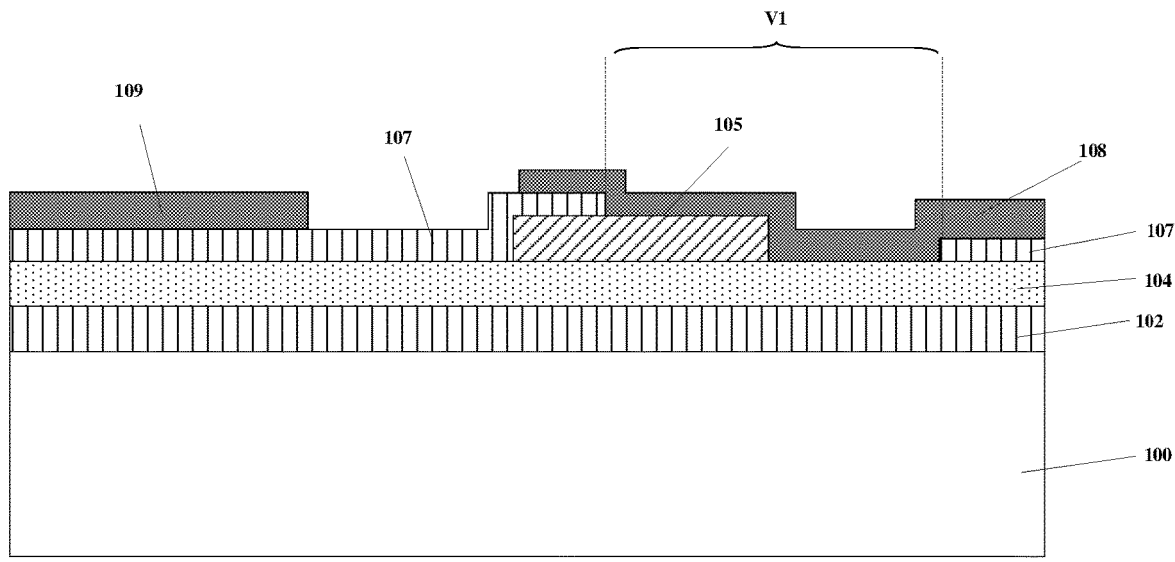
FIG. 2B is a schematic cross-sectional view taken along B-B' shown in FIG. 1B.

FIG. 1B is a partially enlarged schematic view showing the array substrate shown in FIG. 1A. FIG. 2A is a schematic cross-sectional view taken along A-A' shown in FIG. 1B; FIG. 2B is a schematic cross-sectional view taken along B-B' shown in FIG. 1B.

The structure of the sub-pixel 10 according to some embodiments of the present disclosure will be introduced below in conjunction with FIGS. 1B, 2A and 2B. The structure of at least one of the plurality of sub-pixels 10 in the array substrate TA may be the structure of the sub-pixel 10 described hereinafter. In some embodiments, the structure of each sub-pixel 10 in the array substrate TA may be the structure of the sub-pixel 10 described hereinafter.

Referring to FIGS. 1B, 2A and 2B, the sub-pixel 10 comprises a gate 101, a first insulating layer 102, an active layer 103, a pixel electrode 104, a first electrode 105, a second electrode 106, a second insulating layer 107, a connection electrode 108 and a common electrode 109.

The gate 101 is located on one side of the first base substrate 100, as shown in FIG. 2A. Here, the gate 101 is shown to be located on the upper side of the first base substrate 100. The first base substrate 100 may be, for example, a glass substrate or the like. The material of the gate 101 may comprise, for example, metal such as aluminum or copper.

The first insulating layer 102 is located on one side of the first base substrate 100, and the gate 101 is located between the first base substrate 100 and the first insulating layer 102, as shown in FIG. 2A. It should be understood that, the first insulating layer 102 also covers part of the first base substrate 100, as shown in FIG. 2B. As some implementations, the material of the first insulating layer 102 may comprise silicon oxide, silicon nitride (for example, SiNx), silicon oxynitride, or the like.

The active layer 103 is located on one side of the first insulating layer 102 away from the gate 101, as shown in FIG. 2A. For example, the material of the active layer 103 may comprise a semiconductor material such as amorphous silicon, low-temperature polysilicon, or oxide semiconductor. In some embodiments, the material of the active layer 103 may comprise a P-type semiconductor material.

The pixel electrode 104 is located on one side of the first insulating layer 102 away from the first base substrate 100, as shown in FIG. 2B. In addition, for example, the pixel electrode 104 is spaced apart from the active layer 103, as shown in FIG. 1B. As some implementations, the material of the pixel electrode 104 may comprise a transparent material such as indium tin oxide (ITO). It should be understood that, in the present disclosure, the expression of "a member A is spaced apart a member B" means that the member A is insulated from the member B.

The first electrode 105 is located on one side of the active layer 103 and the pixel electrode 104 away from the first base substrate 100, as shown in FIGS. 2A and 2B. Referring to FIG. 2A, the first electrode 105 is connected to the active layer 103. For example, the first electrode 105 may be in contact with the active layer 103. Referring to FIG. 2B, the first electrode 105 is in contact with the pixel electrode 104.

The second electrode 106 is spaced apart from the first electrode 105, as shown in FIGS. 1B and 2A. The second electrode 106 is connected to the active layer 103. For example, the second electrode 106 is in contact with the active layer 103. In addition, the second electrode 106 is also connected to one of the plurality of data lines DL. For example, the second electrode 106 may be integrally provided with the connected data line DL. Here, one of the first electrode 105 and the second electrode 106 is a source, and the other is a drain. For example, the first electrode 105 is a drain, and the second electrode 106 is a source.

The second insulating layer 107 covers the pixel electrode 104, the first electrode 105 and the second electrode 106, as shown in FIGS. 2A and 2B. Referring to FIGS. 1B and 2B, the second insulating layer 107 defines a first opening V1. The orthographic projection of the first opening V1 on the first base substrate 100 partially overlaps with the orthographic projection of the pixel electrode 104 on the first base substrate 100, and partially overlaps with the orthographic projection of the first electrode 105 on the first base substrate 100. In other words, the first opening V1 exposes a part of the pixel electrode 104 and exposes a part of the first electrode 105. That is, a part of the orthographic projection of the first opening V1 on the first base substrate 100 (for example, referred to as a first part) overlaps with the orthographic projection of the pixel electrode 104 on the first base substrate 100 and does not overlap with the orthographic projection of the first electrode 105 on the first base substrate 100; the other part of the orthographic projection of the first opening V1 on the first base substrate 100 (for example, referred to as a second part) overlaps with the orthographic projection of the first electrode 105 on the first base substrate 100. It should be understood that, although the area of the first part of the orthographic projection of the first opening V1 on the first base substrate 100 shown in FIG. 1B is larger than the area of the second part, this is not limitative. For example, the area of the first part of the orthographic projection of the first opening V1 on the first base substrate 100 may also be smaller than or equal to the area of the second part. As some implementations, the material of the first insulating layer 102 may comprise silicon oxide, silicon nitride (for example, SiNx), silicon oxynitride, or the like.

The connection electrode 108 is in contact with the pixel electrode 104 and the first electrode 105 through the first opening V1, as shown in FIG. 2B. In other words, the connection electrode 108 is located at least partially in the first opening V1, in contact with the exposed portion of the pixel electrode 104 and in contact with the exposed portion of the first electrode 105. As some implementations, the material of the connection electrode 108 may comprise a transparent material such as ITO.

The common electrode 109 is located on one side of the second insulating layer 107 away from the pixel electrode 104, and spaced apart from the connection electrode 108, as shown in FIGS. 1B and 2B. As some implementations, the material of the connection electrode 108 may comprise a transparent material such as indium tin oxide.

In some embodiments, the common electrode 109 and the connection electrode 108 are located in a same layer. It should be noted that, in the embodiments of the present disclosure, the expression of "a plurality of members is located in a same layer" means that the plurality of members is formed by patterning a same material layer. For example, the materials of the common electrode 109 and the connection electrode 108 each comprise indium tin oxide. In some embodiments, by patterning a same indium tin oxide material layer, the common electrode 109 and the connection electrode 108 spaced apart from each other may be formed.

In the above embodiments, on one hand, the distance between the pixel electrode 104 and the common electrode 109 is reduced, which increases the storage capacitance of the sub-pixel 10 and reduces the vertical crosstalk of the array substrate. On the other hand, the first electrode 105 is in contact with the pixel electrode 104, and both the first electrode 105 and the pixel electrode 104 are in contact with the connection electrode 108 in the first opening V1, which increases a contact area between the first electrode 105 and the pixel electrode 104 and reduces a resistance between the first electrode 105 and the pixel electrode 104, thereby improving the driving capability of the sub-pixel 10 and improving the display effect of the array substrate.

In some embodiments, the array substrate of the above embodiments may be manufactured by using masks available without additionally increasing the number of masks, thereby facilitating the implementation of the process.

In some embodiments, referring to FIG. 1A, the common electrode 109 of the sub-pixel 10 may comprise a first common electrode portion 109A and a second common electrode portion 109B adjacent to the first common electrode portion 109A. The first common electrode portion 109A is located on one side of the connection electrode 108 away from the gate 101, for example an upper side; and the second common electrode portion 109B is located on one side of the connection electrode 108 away from the data line DL connected to the sub-pixel 10, for example a left side. Here, the second common electrode portion 109B may be considered to protrude outward with respect to the first common electrode portion 109A. The first common electrode portion 109A has a slit SL, and the second common electrode portion 109B does not have a slit. In this way, the luminous efficiency of the sub-pixel 10 is improved, and the capacitance between the pixel electrode 104 and the common electrode 109 is further increased, thereby further reducing the vertical crosstalk of the array substrate.

In some embodiments, the common electrodes 109 of a part of the plurality of sub-pixels 10 are connected to each other, and the common electrodes 109 of the remaining sub-pixels 10 are spaced apart from each other. In this way, it is favorable for improving the uniformity of the common voltage applied on the common electrodes 109 to improve the display uniformity of the array substrate.

In some embodiments, the plurality of sub-pixels 10 comprise a plurality of columns of sub-pixels. At least one column of sub-pixels of the plurality of columns of sub-pixels comprises two adjacent sub-pixels, and two common electrodes 109 of the two adjacent sub-pixels are connected to each other. That is, the part of the sub-pixels 10 above may comprise at least one column of sub-pixels of the plurality of columns of sub-pixels. In the at least one column of sub-pixels, two common electrodes 109 of two adjacent sub-pixels 10 in each column of sub-pixels are connected through a common electrode connector CCL.

For example, referring to FIG. 1A, the plurality of columns of sub-pixels may comprise a plurality of columns of first sub-pixels P1 configured to emit light of a first color, a plurality of columns of second sub-pixels P2 configured to emit light of a second color, and a plurality of columns of third sub-pixels P3 configured to emit light of a third color.

Here, two adjacent columns of third sub-pixels P3 of the plurality of columns of third sub-pixels P3 are spaced apart by one column of first sub-pixels P1 of the plurality of columns of first sub-pixels P1 and one column of second sub-pixels of the plurality of columns of second sub-pixels P2. For example, in the plurality of columns of sub-pixels, the first column of sub-pixels P1, the second column of sub-pixels P2, and the third column of sub-pixels P3 in order are repeatedly arranged. The first color, the second color and the third color are different from each other. In some embodiments, one of the first color, the second color, and the third color is red, and the other two are green and blue. For example, the second color is red, one of the first color and the third color is blue, and the other of the first color and the third color is green.

In some embodiments, the common electrodes 109 of each column of third sub-pixels P3 of two or more columns of third sub-pixels P3 are connected to each other, while the common electrodes 109 of other columns of sub-pixels are spaced apart from each other. For example, the third sub-pixel P3 may be a blue sub-pixel or a green sub-pixel. Referring to FIG. 1A, in each column of third sub-pixels P3, two common electrodes 109 of two adjacent sub-pixels 10 are connected through a common electrode connector CCL. In some embodiments, the two adjacent common electrodes 109 are integrally provided with the common electrode connector CCL. For example, the common electrode connector CCL may be formed at the same time during the process of forming the common electrode 109. For example, the common electrode 109 may be formed to be integrated with the common electrode connector CCL by patterning a same material layer.

In some embodiments, in the two or more columns of third sub-pixels P3 in which the common electrodes 109 of each column of third sub-pixels P3 are connected to each other, two adjacent columns of third sub-pixels P3 are spaced apart by one column of third sub-pixels P3 of the plurality of columns of third sub-pixels P3. Here, the one column of third sub-pixels P3 of the plurality of columns of third sub-pixels P3 are one column of third sub-pixels P3 other than the two or more columns of third sub-pixels P3 in which the common electrodes 109 are connected to each other. That is, the common electrodes 109 in the one column of third sub-pixels P3 are spaced apart from each other. For example, the plurality of columns of third sub-pixels P3 comprise a first column of third sub-pixels P3, a second column of third sub-pixels P3, and a third column of third sub-pixels P3 arranged from left to right. The common electrodes 109 of each column of third sub-pixels P3 in the first column of sub-pixels P3 and the third column of sub-pixels P3 are connected to each other, and the common electrodes 109 of the second column of third sub-pixels P3 are spaced apart from each other. In this way, the display uniformity of the array substrate is improved, and an excessive coupling capacitance between too many common electrode connectors CCL and other metal layers is prevented, thereby further improving the display effect of the array substrate.

In some embodiments, referring to FIG. 1A, the plurality of sub-pixels 10 comprises a plurality of rows of sub-pixels, for example R1 row of sub-pixels, and R2 row of sub-pixels, etc. It should be understood that, FIG. 1A only schematically shows two rows of sub-pixels. The two gates 101 of two adjacent sub-pixels 10 in each row of sub-pixels of the plurality of rows of sub-pixels are connected through a gate connector GCL. Here, the orthographic projection of the gate connector GCL on the first substrate 100 partially overlaps with the orthographic projection of the common electrode connector CCL on the first substrate 100, and partially overlaps with the orthographic projection of the data line DL on the first substrate 100.

The inventors have also noticed that, the data line DL may fracture at the position overlapping with the gate connector GCL, which may affect the display effect of the array substrate. Accordingly, the embodiments of the present disclosure further provide the following solutions.

In some embodiments, the data line DL extends along a first direction (for example, a column direction). Referring to FIG. 1B, the data line DL may comprise a first data line portion DL11 and a second data line portion DL12 adjacent to the first data line portion DL11. Here, the first data line portion DL11 does not overlap with the gate connector GCL, and the second data line portion DL12 partially overlaps with the gate connector GCL. In addition, the length L2 of the second data line portion DL12 in a second direction (for example, a row direction) perpendicular to the first direction is greater than the length L1 of the first data line portion DL11 in the second direction. In this way, the region of the data line DL overlapping with the gate connector GCL is increased, thereby reducing the possibility of fracture of the data line DL at the position overlapping with the gate connector GCL.

It should be understood that, in the present disclosure, the expression of "a member A is adjacent to a member B" can be understood as the member A is neighboring to the member B and connected to the member B. In some embodiments, the member A and the member B may be provided integrally. In this case, the member A and the member B are different parts of a same member.

As some implementations, the ratio of the length L2 of the second data line portion DL12 in the second direction to the length L1 of the first data line portion DL11 in the second direction is greater than 1 and smaller than or equal to 1.4, for example, 1.2, 1.3, etc. As some implementations, L2 is 1 to 2 microns greater than L1, for example, L2 is 1 micron, 1.5 microns, 1.18 microns, or 2 microns greater than L1. In this way, the possibility of fracture of the data line DL at the position overlapping with the gate connector GCL is reduced, and an excessive coupling capacitance between a too wide data line DL and the surrounding metal is prevented.

In other embodiments, the extending direction of the gate connector GCL is not perpendicular to and not parallel to the first direction in which the data line DL extends. For example, the angle between the extending direction of the gate connector GCL and the first direction in which the data line DL extends is greater than or equal to 45 degrees and smaller than 90 degrees, for example 60 degrees, 80 degrees, etc. In this way, the region where the gate connector GCL overlaps with the data line DL is enlarged, thereby reducing the possibility of fracture of the data line DL at the position overlapping with the gate connector GCL.

In still other embodiments, the length L2 of the second data line portion DL12 in the second direction perpendicular to the first direction in which the data line DL extends is greater than the length L1 of the first data line portion DL11 in the second direction, and the extension direction of the gate connector GCL is not perpendicular to and not parallel to the first direction in which the data line DL extends. In this way, the possibility of fracture of the data line DL at the position overlapping with the gate connector GCL is further reduced.

In some embodiments, referring to FIG. 1A, the array substrate further comprises a plurality of common voltage lines 11 connected to a plurality of rows of sub-pixels. Each of the plurality of common voltage lines 11 is configured to apply a common voltage to common electrodes of a corresponding row of sub-pixels of the plurality of rows of sub-pixels. For example, the number of the plurality of common voltage lines 11 is the same as the number of rows of the plurality of rows of sub-pixels, and one common voltage line 11 corresponds to one row of sub-pixels. In this case, each common voltage line 11 applies a common voltage to common electrodes of one corresponding row of sub-pixels.

In some embodiments, the orthographic projection of the common voltage line 11 on the first base substrate 100 does not overlap with the orthographic projection of the pixel electrode 104 on the first base substrate 100.

The inventors have also noticed that, the connection manner of the common voltage line 11 and the common electrode 109 may affect the thickness uniformity of an alignment layer, thereby affecting the display uniformity of the array substrate. Accordingly, the embodiments of the present disclosure also provide the following solutions.

Figure 2C:
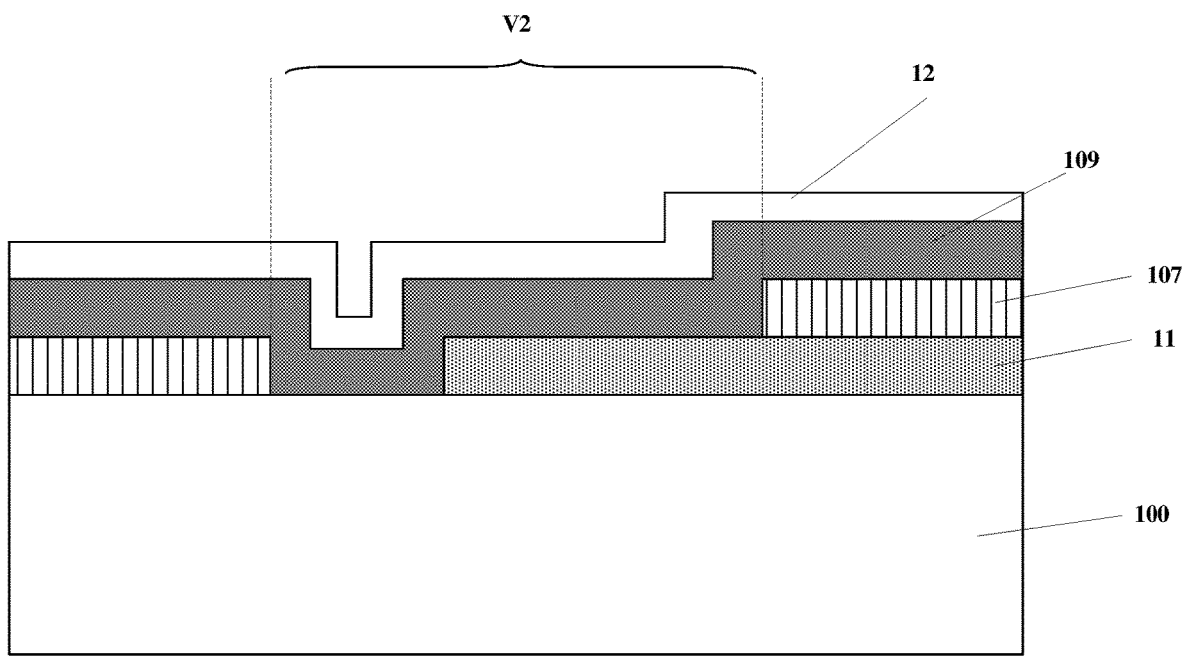
FIG. 2C is a schematic cross-sectional view taken along C-C' shown in FIG. 1A.

FIG. 2C is a schematic cross-sectional view taken along C-C' shown in FIG. 1A.

As shown in FIG. 2C, in some embodiments, the array substrate TA further comprises a first alignment layer 12. The first alignment layer 12 is located on one side of the common electrode 109 away from the first base substrate 100. As some implementations, the material of the first alignment layer 12 may comprise polyimide (PI).

The second insulating layer 107 of each sub-pixel 10 in each row of sub-pixels of the plurality of rows of sub-pixels defines a second opening V2, as shown in FIG. 1A. The common electrode 109 of each sub-pixel 10 in each row of sub-pixels is in contact with one common voltage line 11 of the plurality of common voltage lines 11 corresponding to each row of sub-pixels through the second opening V2 and is in contact with the first base substrate 100 through the second opening V2. In some embodiments, the plurality of common voltage lines 11 is located in a same layer as the gate 101.

It should be understood that, for a certain row of sub-pixels, the second opening V2 of each sub-pixel 10 exposes a part of the common electrode line 11 corresponding to this row of sub-pixels and exposes a part of the first base substrate 100, as shown in FIG. 2C. The common electrode 109 is partially located in the second opening V2, and in contact with the exposed portion of the common electrode line 11 and the exposed portion of the first base substrate 100.

In the above embodiments, the common electrode 109 is in contact with both the common voltage line 11 and the first base substrate 100 through the second opening V2. Compared with the common electrode 109 only in contact with the common voltage line 11 through the second opening V2 (i.e., the second opening V2 exposes only a part of the common voltage line 11), such a structure is favorable for liquid of forming first alignment layer 12 to flow into the second opening V2, and allows a more uniform flow of the liquid, thereby making the thickness of the first alignment layer 12 more uniform and further improving the display uniformity of the array substrate.

The inventors have noticed that, in some cases, the position of the second opening V2 may deviate from a desired position. In this case, the common electrode 109 may only be in contact with the first base substrate 100 through the second opening V2 but cannot be in contact with a corresponding common voltage line 11. In view of this, the embodiments of the present disclosure propose the following solutions.

In some embodiments, referring to FIG. 1A, the common voltage line 11 connected to each row of sub-pixels 10 comprises a first common voltage line portion 111, a second common voltage line portion 112 and a third common voltage line portion 113. The third common voltage line portion 113 is located between the first common voltage line portion 111 and the second common voltage line portion 112, and adjacent to the first common voltage line portion 111 and the second common voltage line portion 112 respectively. The length L4 of the second common voltage line portion 112 in the first direction perpendicular to the second direction in which the common voltage line 11 extends is greater than the length L3 of the first common voltage line portion 111 in the first direction, and the length L3 of the first common voltage line portion 111 in the first direction is greater than the length L5 of the third common voltage line portion 113 in the first direction. The common electrode 109 of each sub-pixel 10 in each row of sub-pixels is in contact with the second common voltage line portion 112 through the second opening V2.

In this way, a wider second common voltage line portion 112 is more favorable for ensuring that the common electrode 109 is in contact with the common voltage line 11. In addition, since the third common voltage line portion 113 is relatively narrower than the first common voltage line portion 111 and the second common voltage line portion 112, it is more favorable for ensuring that the common electrode 109 is in contact with the first base substrate 100. Therefore, such a structure is more favorable for the common electrode 109 to be in contact with both the first base substrate 100 and the common voltage line 11.

In some embodiments, the common voltage line 11 further comprises a fourth common voltage line portion 114 overlapping with the data line DL, the fourth common voltage line portion 112 is adjacent to the second common voltage line portion 112. The length L6 of the fourth common voltage line portion 114 in the first direction is smaller than the length L4 of the second common voltage line portion 112 in the first direction. As such, the coupling capacitance between the common voltage line 11 and the data line DL is reduced.

The embodiments of the present disclosure further provide a display device comprising the array substrate according to any one of the above embodiments. In some embodiments, the display device may be any product or component with a display function, for example, a display panel, a mobile terminal, a television, a monitor, a notebook computer, a digital photo frame, a navigator, or an electronic paper. For example, the display device may have a size of 55 inches, 65 inches, 75 inches, etc., and may have a resolution of 4K, 8K or higher.

Figure 3:
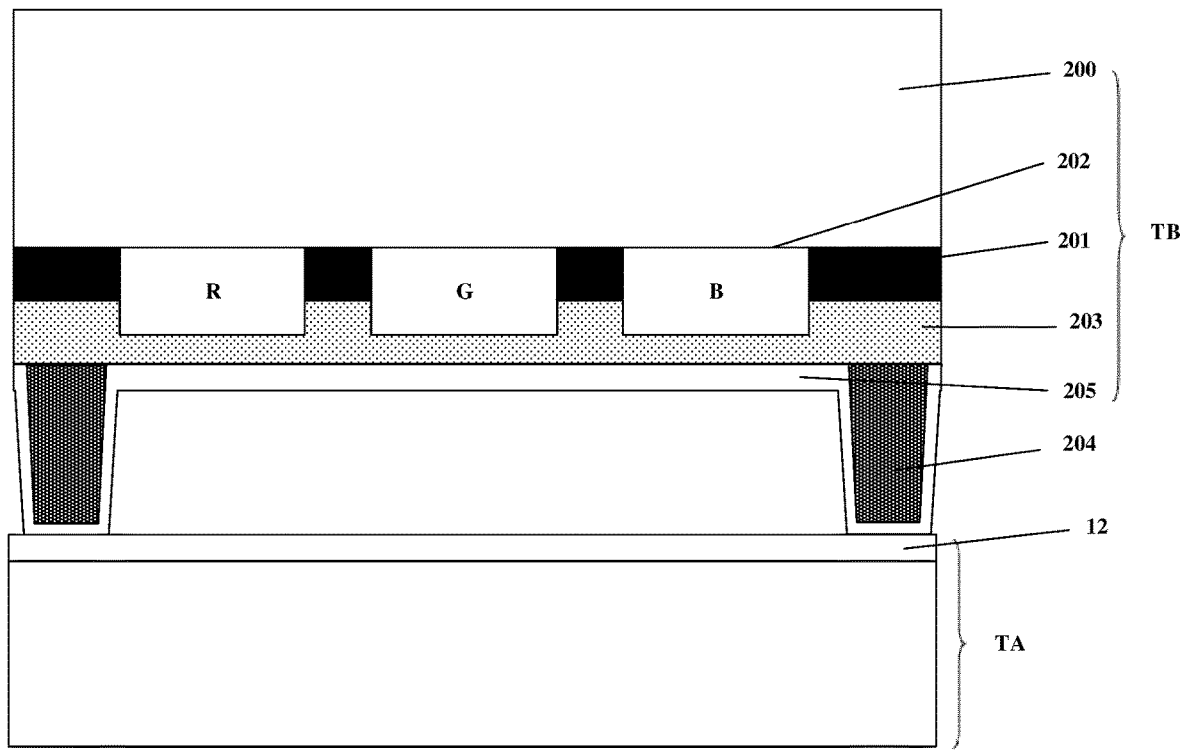
FIG. 3 is a schematic structural view showing a display device according to an embodiment of the present disclosure.

FIG. 3 is a schematic structural view showing a display device according to an embodiment of the present disclosure.

As shown in FIG. 3, the display device comprises an array substrate TA and a color filter substrate TB opposite to the array substrate TA. The color filter substrate TB comprises a second base substrate 200, a black matrix 201, a light filter layer 202, a planarization layer 203 and a plurality of spacers 204. It should be understood that, liquid crystal is provided between the array substrate TA and the color filter substrate TB.

The second base substrate 200 may be, for example, a glass substrate. Both the black matrix 201 and the light filter layer 202 are located on one side of the second base substrate 200 close to the array substrate TA. FIG. 1A shows the black matrix 201 in dashed lines. It should be understood that, the region of the sub-pixel 10 not covered by the black matrix 201 is a light-emitting region.

The light filter layer 202 comprises a plurality of light filter units, for example, a red light filter unit R, a green light filter unit G, and a blue light filter unit B. Adjacent light filter units of the plurality of light filter units are spaced apart by the black matrix 201. For example, the red light filter unit R and the green light filter unit G are spaced apart by the black matrix 201, and the green light filter unit G and the blue light filter unit B are spaced apart by the black matrix 201.

The planarization layer 203 is located on one side of the black matrix 201 and the light filter layer 202 close to the array substrate TA. For example, the material of the planarization layer 203 comprises resin, photoresist, or the like.

The plurality of spacers 204 is located between the planarization layer 203 and the array substrate TA. The orthographic projection of each of the plurality of spacers 204 on the second base substrate 200 is located within the orthographic projection of the black matrix 201 on the second base substrate 100. For example, the material of the spacer 204 may comprise resin or photoresist.

The inventors have noticed that, the spacers 204 may move under the effect of an external force, thereby causing damage to the array substrate TA. For example, it is possible to cause damage to the first alignment layer 12 of the array substrate TA, thereby affecting the display effect of the display device. Since the orthographic projection of the spacer 204 on the second base substrate 100 is within the orthographic projection of the black matrix 201 on the second base substrate 100, even if the spacer 204 moves, as long as the spacer 204 is covered by the black matrix 201, the display effect of the display device will not be adversely affected. Therefore, such a structure is favorable for reducing the adverse effect of the movement of the spacer 204 on the display effect of the display device.

In some embodiments, a region of each first sub-pixel in the plurality of columns of first sub-pixels P1 not covered by the black matrix 201, a region of each second sub-pixel in the plurality of columns of second sub-pixels P2 not covered by the black matrix 201, and a region of each third sub-pixel in the plurality of columns of third sub-pixels P3 not covered by the black matrix 201 each is a light-emitting region. The area of the light-emitting region of each second sub-pixel is smaller than the area of the light-emitting region of each first sub-pixel and the area of the light-emitting region of each third sub-pixel.

In some embodiments, the color filter substrate TB further comprises a second alignment layer 205 located on one side of the planarization layer 203 close to the array substrate TA and on the surface of the spacer 204. As some implementations, the material of the second alignment layer 205 may comprise polyimide (PI).

In some embodiments, the plurality of sub-pixels 10 comprises a plurality of columns of first sub-pixels P1 configured to emit light of a first color, a plurality of columns of second sub-pixels P2 configured to emit light of a second color, and a plurality of columns of third sub-pixels P3 configured to emit light of a third color. Two adjacent columns of second sub-pixels P2 of the plurality of columns of second sub-pixels P2 are spaced apart by one column of first sub-pixels P1 of the plurality of columns of first sub-pixels P1 and one column of third sub-pixels P3 of the plurality of columns of third sub-pixels P3. The plurality of spacers 204 comprises a plurality of columns of spacers corresponding to the plurality of columns of second sub-pixels P2. For example, the number of columns of the plurality of columns of second sub-pixels P2 is the same as the number of columns of the plurality of columns of spacers, that is, one column of second sub-pixels P2 corresponds to one column of spacers.

For the ease of description, the orthographic projection of each spacer 204 in each column of spacers of the plurality of columns of spacers on the first base substrate 100 is defined as a first projection, and the orthographic projection of the gate 101 of a second sub-pixel P2 in one row of second sub-pixels P2 of the plurality of rows of second sub-pixels P2 corresponding to each column of spacers on the first base substrate 100 is defined as a second projection, the orthographic projection of the active layer 103 of the second sub-pixel P2 on the first base substrate 100 is defined as a third projection, and the orthographic projection of the data line DL connected to the second sub-pixel P2 on the first base substrate 100 is defined as a fourth projection.

Referring to FIGS. 1A and 1B, in some embodiments, the first projection of the spacer 204 is located within the second projection of the gate 101 and located on one side of the third projection of the active layer 103 away from the fourth projection of the data line DL. With such a structure, the spacer 204 has a small adverse effect on the light emission of the sub-pixel 10.

It should be noted that, in FIGS. 1A and 1B, the first projection of the spacer 204 is shown to conform to the spacer 204. Similarly, other components shown in FIGS. 1A and 1B may also be understood as orthographic projections of other components on the first base substrate 100. The first projection of the spacer 204 shown in FIGS. 1A and 1B may be understood as the orthographic projection of the surface of the spacer 204 close to the planarization layer 203 on the first base substrate 100.

It should also be noted that, although the shape of the first projection of the spacer 204 shown in FIGS. 1A and 1B is an octagonal, this is not restrictive, and the shape of the first projection of the spacer 204 may also be circular, or other polygons.

In some embodiments, the second color is red, that is, the second sub-pixel P2 is a red sub-pixel. The brightness of the red sub-pixel is smaller than the brightness of the blue sub-pixel and the green sub-pixel. In a case where the position of the plurality of spacers is provided to correspond to the plurality of columns of red sub-pixels, the adverse effect of the plurality of spacers 204 on the display device can be reduced as much as possible.

In some embodiments, referring to FIGS. 1A and 1B, each second sub-pixel P2 in each column of second sub-pixels further comprises a plurality of blocking portions 110 configured to block movement of the spacers 204, and the orthographic projection of each blocking portion 110 on the first base substrate 100 is located within the orthographic projection of the black matrix 201 on the first base substrate 100. The plurality of blocking portions 110 comprises a first blocking portion 110A and a second blocking portion 110B. The first blocking portion 110A is located on one side of one of the plurality of spacers 204 corresponding to the second sub-pixel P2 close to the pixel electrode 104, and the second blocking portion 110B is located on one side of the first blocking portion 110A away from the one of the plurality of spacers 204. In addition, the height of the second blocking portion 110B is greater than the height of the first blocking portion 110A. It should be understood that, in the present disclosure, the height of a certain component may be understood as the length of the component extending in a direction perpendicular to the surface of the first base substrate 100.

In the above embodiments, the first blocking portion 110A with a relative smaller height can block movement of the spacer 204. Even if the spacer 204 crosses over the first blocking portion 110A, the first blocking portion 110A also produces a buffering effect and reduces movement speed of the spacer 204, so that the second blocking portion 110B with a relative greater height can more effectively block movement of the spacer 204. In this way, the spacer 204 can be more effectively blocked from moving to the light-emitting region of the second sub-pixel P2, thereby preventing adverse effect of the spacer 204 on the second sub-pixel P2.

In some embodiments, referring to FIG. 1A, the plurality of blocking portions 110 of the second sub-pixel P2 further comprises a third blocking portion 110C. The first blocking portion 110A and the second blocking portion 110B are located on a first side of the light-emitting region of the second sub-pixel P2. The third blocking portion 110C is located on a second side of the light-emitting region of the second sub-pixel P2. The second side is opposite to the first side. The third blocking portion 110C can block the spacer 204 in an adjacent second sub-pixels P2 located in the same column as the second sub-pixel P2 from moving to the light-emitting region of the second sub-pixel P2, thereby further preventing the influence of the spacer 204 on the second sub-pixel P2.

In some embodiments, the plurality of blocking portions 110 may be formed during the process of forming other layers of the array substrate. The following description will be made in conjunction with FIG. 4, FIG. 2A and FIG. 2B.

Figure 4:
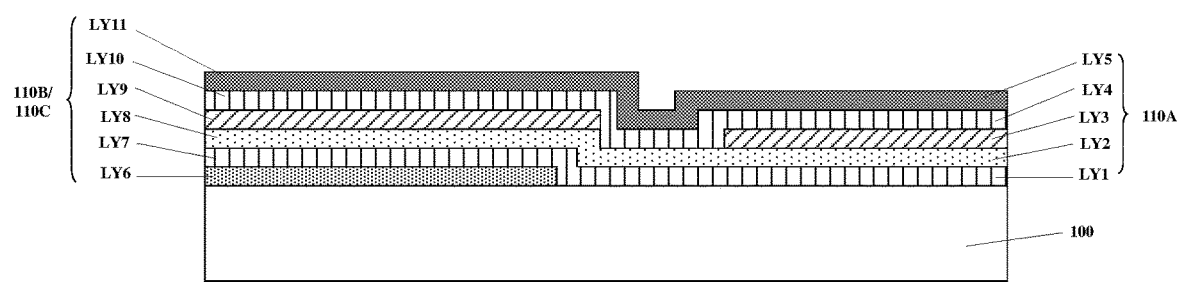
FIG. 4 is a schematic cross-sectional view taken along D-D' shown in FIG. 1B.

FIG. 4 is a schematic cross-sectional view taken along D-D' shown in FIG. 1B.

As shown in FIG. 4, the first blocking portion 110A comprises a first layer LY1, a second layer LY2, a third layer LY3, a fourth layer LY4 and a fifth layer LY5 which are sequentially arranged on one side of the first base substrate 100. At least one of the second blocking portion 110B or the third blocking portion 110C comprises a sixth layer LY6, a seventh layer LY7, an eighth layer LY8, a ninth layer LY9, a tenth layer is LY10 and an eleventh layer LY11 which are sequentially arranged on the one side of the first base substrate 100.

The first layer LY1, the seventh layer LY7 and the first insulating layer 102 which is shown in FIG. 2B are located in a same layer; the second layer LY2, the eighth layer LY8 and the pixel electrode 104 which is shown in FIG. 2B are located in a same layer; the third layer LY3, the ninth layer LY9 and the first electrode 105 which is shown in FIG. 2B are located in a same layer; the fourth layer LY4, the tenth layer LY10 and the second insulating layer 107 which is shown in FIG. 2B are located in a same layer; the fifth layer LY5, the eleventh layer LY11 and the common electrode 109 which is shown in FIG. 2B are located in a same layer; and the sixth layer LY6 and the gate 101 which is shown in FIG. 2A are located in a same layer.

The embodiments of the present disclosure also provide a manufacturing method of an array substrate. The manufacturing method comprises forming a plurality of data lines and a plurality of sub-pixels on one side of a first base substrate. The process of forming at least one of the plurality of sub-pixels will be described below in conjunction with FIG. 5.

Figure 5:
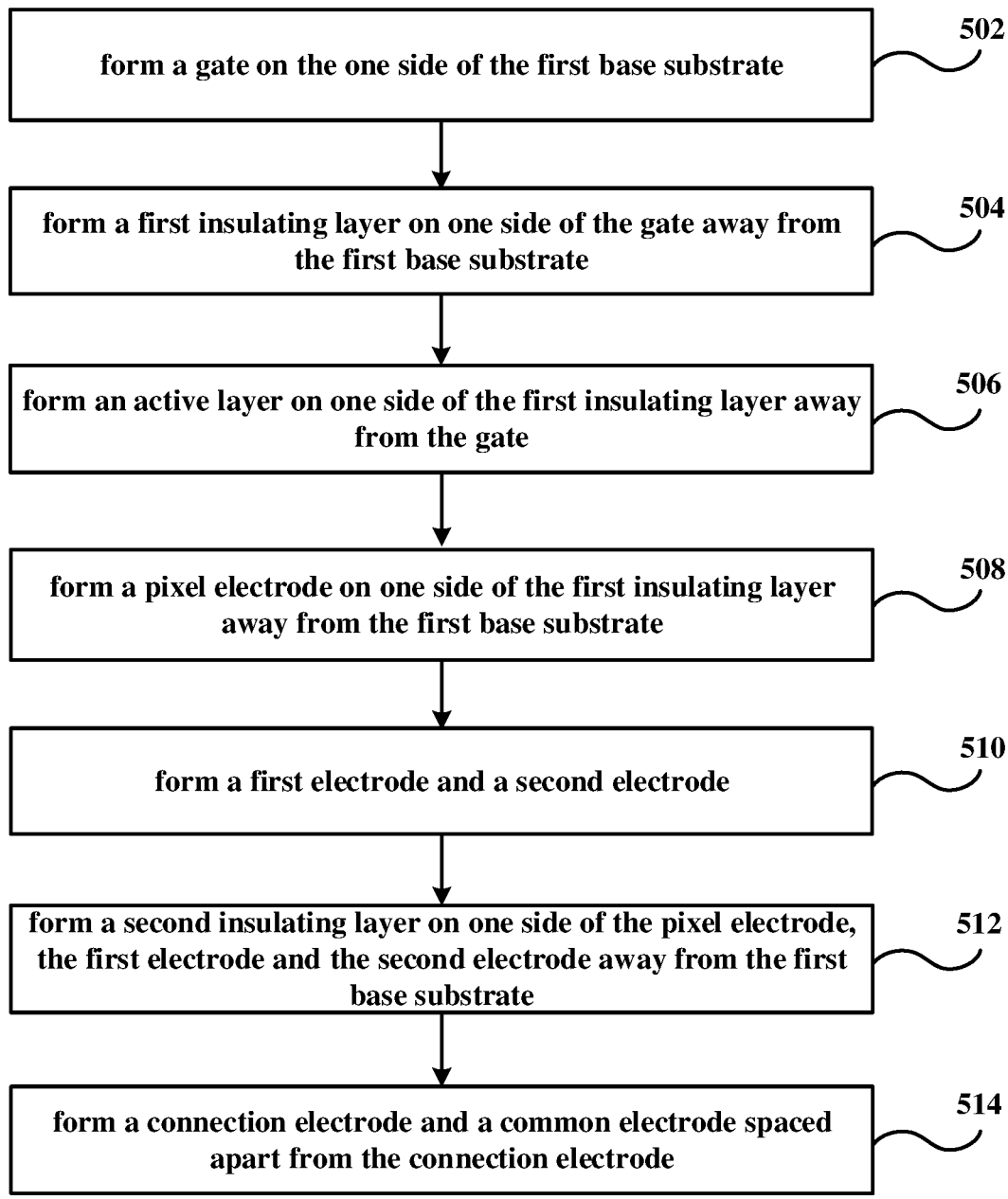
FIG. 5 is a schematic flowchart showing a manufacturing method of a sub-pixel according to an embodiment of the present disclosure.

FIG. 5 is a schematic flowchart showing a manufacturing method of a sub-pixel according to an embodiment of the present disclosure.

At step 502, a gate is formed on one side of the first base substrate.

At step 504, a first insulating layer is formed on one side of the gate away from the first base substrate.

At step 506, an active layer is formed on one side of the first insulating layer away from the gate.

At step 508, a pixel electrode is formed on one side of the first insulating layer away from the first base substrate.

At step 510, a first electrode and a second electrode are formed. For example, the first electrode and the second electrode may be formed through a same patterning process.

The first electrode is located on one side of the active layer and the pixel electrode away from the first base substrate, and the first electrode is connected to the active layer. In addition, the first electrode is in contact with the pixel electrode.

The second electrode is spaced apart from the first electrode, and the second electrode is connected to the active layer and one of the plurality of data lines.

At step 512, a second insulating layer is formed on one side of the pixel electrode, the first electrode and the second electrode away from the first base substrate. The second insulating layer defines a first opening, the orthographic projection of the first opening on the first base substrate partially overlaps with the orthographic projection of the pixel electrode on the first base substrate, and partially overlaps with the orthographic projection of the first electrode on the first base substrate.

At step 514, a connection electrode and a common electrode spaced from the connection electrode are formed. For example, the common electrode and the connection electrode may be formed through the same patterning process.

Here, the connection electrode is in contact with both the pixel electrode and the first electrode through the first opening, and the common electrode is located on one side of the second insulating layer away from the pixel electrode.

In the array substrate formed by the above embodiments, on one hand, the distance between the pixel electrode and the common electrode is reduced, which increases the storage capacitance of the sub-pixel and reduces the vertical crosstalk of the array substrate. On the other hand, the first electrode is in contact with the pixel electrode, and both the first electrode and the pixel electrode are in contact with the connection electrode in the first opening, which increases a contact area between the first electrode and the pixel electrode and reduces a resistance between the first electrode and the pixel electrode, thereby improving the driving capability of the sub-pixel and improving the display effect of the array substrate.

In some implementations, the second insulating layer may be formed in the following manner. First, an insulating material layer covering the pixel electrode, the first electrode and the second electrode is formed. Then, a mask with a third opening is formed on one side of the insulating material layer away from the first base substrate. Afterwards, the insulating material layer is patterned using the mask to obtain the second insulating layer with the first opening.

The above mask may be manufactured by using a mask available without additionally increasing the number of masks, which facilitates the implementation of the process.

When the display panel is driven to display, a gate scanning signal is written to the gate line row by row, and a data voltage signal is written to the data line at the same time, so that the sub-pixels in the display panel are lit row by row.

The gate scanning signal is provided by a gate driving circuit, and the data voltage signal is provided by a source driving circuit. In some embodiments, the gate driving circuit may be integrated in a gate driving chip, and the source driving circuit may be integrated in a source driving chip. In other embodiments, in order to reduce the number of chips and realize a narrow bezel or zero bezel, the gate driving circuit may be integrated in the array substrate. The gate driving circuit comprises a plurality of cascade shift register units integrated in the array substrate, the plurality of shift register units is connected to a plurality of gate lines in one-to-one correspondence. Each shift register unit is configured to provide a gate scanning signal for a gate line connected to this shift register unit.

In order to more explicitly explain how the shift register unit realizes the output of the gate scanning signal, description will be made below in conjunction with some examples of the shift register unit.

Figure 6:
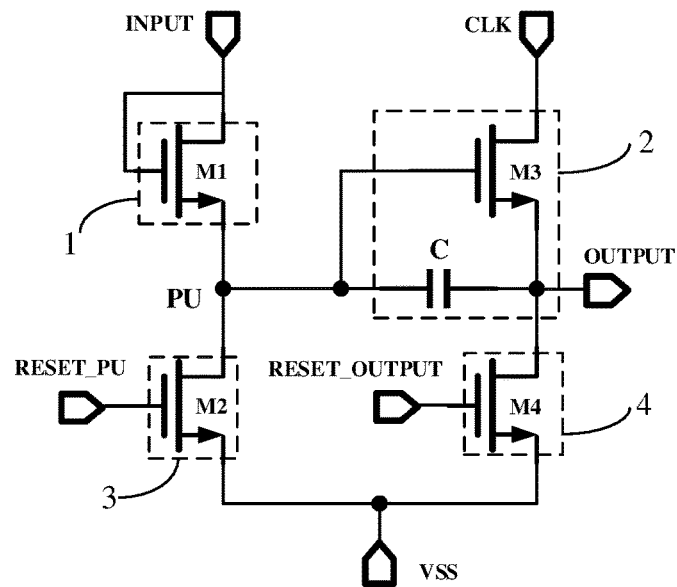
FIGS. 6 to 8 are schematic structural views showing a shift register unit according to some embodiments of the present disclosure.
Figure 7:
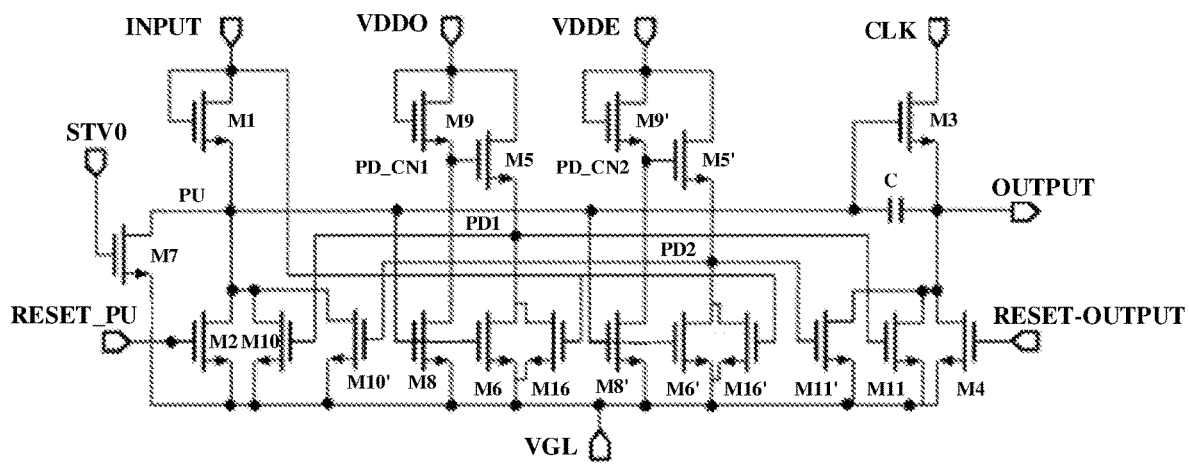
Figure 8:
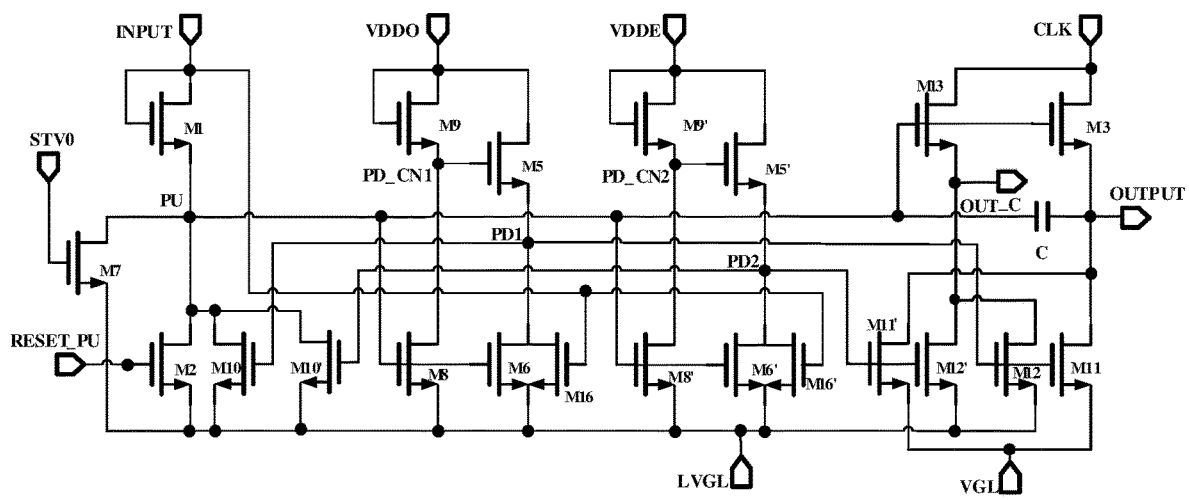

FIGS. 6-8 are schematic structure views showing a shift register unit according to some embodiments of the present disclosure.

In some embodiments, as shown in FIG. 6, the shift register unit comprises an input sub-circuit 1, an output sub-circuit 2, a pull-up reset sub-circuit 3 and an output reset sub-circuit 4. The input sub-circuit 1 charges the pull-up node PU in response to an input signal input by the signal input terminal INPUT. The output sub-circuit 2 outputs a clock signal input by the clock signal terminal CLK through the signal output terminal OUTPUT, in response to the potential of the pull-up node PU. The pull-up reset sub-circuit 3 resets the pull-up node PU in response to a pull-up reset signal output by the pull-up reset signal terminal RESET PU, for example, resets the potential of the pull-up node PU to a low level. The output reset sub-circuit 4 resets the signal output terminal OUTPUT in response to an output reset signal, for example, resets the potential of the signal output terminal OUTPUT to a low level.

In some embodiments, as shown in FIG. 6, the input sub-circuit 1 comprises a first transistor M1, the pull-up reset sub-circuit 3 comprises a second transistor M2, the output sub-circuit 2 comprises a third transistor M3 and a storage capacitor C, and the output reset sub-circuit 4 comprises a fourth transistor M4. The gate and the source of the first transistor M1 are connected to the signal input terminal INPUT, and the drain of the first transistor M1 is connected to the pull-up node PU. The gate of the second transistor M2 is connected to the pull-up reset signal terminal RESET PU, the source of the second transistor M2 is connected to the pull-up node PU, and the drain of the second transistor M2 is connected to the low-level signal terminal VSS. The gate of the third transistor M3 is connected to the pull-up node PU, the source of the third transistor M3 is connected to the clock signal terminal CLK, and the drain of the third transistor M3 is connected to the signal output terminal OUTPUT. The first terminal of the storage capacitor C is connected to the pull-up node PU, and the second terminal of the storage capacitor C is connected to the signal output terminal OUTPUT. The gate of the fourth transistor M4 is connected to the output reset signal terminal RESET OUTPUT, the source of the fourth transistor M4 is connected to the signal output terminal OUTPUT, and the drain of the fourth transistor M4 is connected to the low-level signal terminal VSS.

The operation process of the shift register unit shown in FIG. 6 will be described below.

In an input stage, the signal input terminal INPUT is written with a high-level signal, and the first transistor M1 is turned on. The high-level signal pulls up the potential of the pull-up node PU, and charges the storage capacitor C.

In an output stage, since the potential of the pull-up node PU is pulled up in the input stage, the third transistor M3 is turned on, and the high-level signal input by the clock signal terminal CLK is output to a gate line connected to the shift register unit through the signal output terminal OUTPUT.

In a reset stage, a high-level signal is input to the output reset signal terminal RESET OUTPUT, the fourth transistor M4 is turned on, and the low-level signal input by the low-level signal terminal VSS pulls down the potential of output of the signal output terminal OUTPUT. A high-level signal is input to the pull-up reset signal terminal RESET PU, the second transistor M2 is turned on, and the potential of the pull-up node PU is pulled down by a low-level signal input by the low-level signal terminal VSS. In this way, the pull-up node PU and the signal output terminal OUTPUT are reset.

It should be noted that, in some embodiments, the shift register unit may not be provided with the output reset sub-circuit 4. In the reset stage, after the pull-up node PU is reset, the potential of the pull-up node PU is at a low level, the third transistor M3 is turned off at this time, and the signal output terminal OUTPUT no longer outputs the high-level signal input by the clock signal terminal CLK, thereby realizing the reset of the signal output terminal OUTPUT.

In some embodiments, in the gate driving circuit comprising the above shift register unit, the signal output terminal OUTPUT of a shift register unit of a stage is connected to the pull-up reset signal terminal RESET PU of a shift register unit of a former stage and connected to the signal input terminal INPUT of a stage shift register unit of a latter stage.

In other embodiments, as shown in FIG. 7, in addition to the input sub-circuit, the output sub-circuit, and the pull-up reset sub-circuit described above, the shift register unit further comprises a first pull-down control sub-circuit, a second pull-down control sub-circuit circuit, a first pull-down sub-circuit, a second pull-down sub-circuit, a first noise reduction sub-circuit, a second noise reduction sub-circuit, a discharge sub-circuit, a first auxiliary sub-circuit, and a second auxiliary sub-circuit. In response to a signal input by the signal terminal STVO, the discharge circuit discharges the pull-up node PU through a low-level signal input by the low-level signal terminal VGL. The first pull-down control sub-circuit and the second pull-down control sub-circuit have a same structure, a same function and operate in a time-sharing manner. Similarly, the first pull-down sub-circuit and the second pull-down sub-circuit have a same structure and a same function, the first auxiliary sub-circuit and the second auxiliary sub-circuit have a same structure and a same function, and the first noise reduction sub-circuit and the second noise reduction sub-circuit have a same structure and a same function. The input sub-circuit, the output sub-circuit, and the pull-up reset sub-circuit have the same structure and function as described above and will not be described in detail here.

The first auxiliary sub-circuit and the second auxiliary sub-circuit pull down the potentials of the first pull-down node PD1 and the second pull-down node PD2 through a low-level signal respectively, in response to an input signal input by the signal input terminal INPUT. The first pull-down control sub-circuit controls the potential of the first pull-down node PD1 in response to a first power supply voltage input by the first power supply voltage signal terminal VDDO, and the second pull-down control sub-circuit controls the potential of the second pull-down node PD2 in response to a second power supply voltage input by the second power supply voltage signal terminal VDDE. In response to the potential of the pull-up node PU, the first pull-down sub-circuit pulls down the potentials of the first pull-down node PD1 and the first pull-down control node PD CN1 through a low-level signal input by the low-level signal terminal VGL. In response to the potential of the pull-up node PU, the second pull-down sub-circuit pulls down the potentials of the second pull-down node PD2 and the second pull-down control node PD_CN2 through a low-level signal input by the low-level signal terminal VGL. In response to the potential of the first pull-down node PD1, the first noise reduction sub-circuit performs noise reduction on the pull-up node PU and the signal output by the signal output terminal OUTPUT through a low-level signal input by the low-level signal terminal VGL.

In some embodiments, as shown in FIG. 7, the first pull-down control sub-circuit and the second pull-down control sub-circuit each comprise a fifth transistor and a ninth transistor. The fifth transistors in the first pull-down control sub-circuit and in the second control sub-circuit are represented by M5 and M5' respectively, and the ninth transistors in the first pull-down control sub-circuit and in the second control sub-circuit are represented by M9 and M9' respectively. The first pull-down sub-circuit and the second pull-down sub-circuit each comprise a sixth transistor and an eighth transistor. The sixth transistors in the first pull-down sub-circuit and the second pull-down sub-circuit are represented by M6 and M6' respectively, and the eighth transistors in the first pull-down sub-circuit and the second pull-down sub-circuit are represented by M8 and M8' respectively. The first noise reduction sub-circuit and the second noise reduction sub-circuit each comprise a tenth transistor and an eleventh transistor. The tenth transistors in the first noise reduction sub-circuit and the second noise reduction sub-circuit are represented by M10 and M10' respectively, and the eleventh transistors in the first noise reduction sub-circuit and the second noise reduction sub-circuit are represented by M11 and M11' respectively. The discharge sub-circuit comprises a seventh transistor M7. The first auxiliary sub-circuit and the second auxiliary sub-circuit each comprise a sixth transistor, which is represented by M16 and M16' respectively.

Referring to FIG. 7, the gate, and the source of the first transistor M1 are connected to the signal input terminal INPUT, and the drain of the first transistor M1 is connected to the pull-up node PU. The gate of the second transistor M2 is connected to the pull-up reset signal terminal RESET PU, the source of the second transistor M2 is connected to the pull-up node PU, and the drain of the second transistor M2 is connected to the low-level signal terminal VGL. The gate of the third transistor M3 is connected to the pull-up node PU, the source of the third transistor M3 is connected to the clock signal terminal CLK, and the drain of the third transistor M3 is connected to the signal output terminal OUTPUT. The first terminal of the storage capacitor C is connected to the pull-up node PU, and the second terminal of the storage capacitor C is connected to the signal output terminal OUTPUT. The gate and the source of the ninth transistor M9 are both connected to the first power supply voltage terminal VDDO, and the drain of the ninth transistor M9 is connected to the first pull-down control node PD CN1. The gate of the fifth transistor M5 is connected to the first pull-down control node PD CN1, the source of the fifth transistor M5 is connected to the first power supply voltage terminal VDDO, and the drain of the fifth transistor M5 is connected to the first pull-down node PD1. The gate and the source of the ninth transistor M9' are both connected to the second power supply voltage terminal VDDE, and the drain of the ninth transistor M9' is connected to the second pull-down control node PD_CN2. The gate of the fifth transistor M5' is connected to the second pull-down control node PD_CN2, the source of the fifth transistor M5' is connected to the second power supply voltage terminal VDDE, and the drain of the fifth transistor M5' is connected to the second pull-down node PD2. The gate of the sixth transistor M6 is connected to the pull-up node PU, the source of the sixth transistor M6 is connected to the first pull-down node PD1, and the drain of the sixth transistor M6 is connected to the low-level signal terminal VGL. The gate of the eighth transistor M8 is connected to the pull-up node PU, the source of the eighth transistor M8 is connected to the first pull-down control node PD CN1, and the drain of the eighth transistor M8 is connected to the low-level signal terminal VGL. The gate of the sixth transistor M6' is connected to the pull-up node PU, the source of the sixth transistor M6' is connected to the second pull-down node PD2, and the drain of the sixth transistor M6' is connected to the low-level signal terminal VGL. The gate of the eighth transistor M8' is connected to the pull-up node PU, the source of the eighth transistor M8' is connected to the second pull-down control node PD_CN2, and the drain of the eighth transistor M8' is connected to the low-level signal terminal VGL. The gate of the tenth transistor M10 is connected to the first pull-down node PD1, the source of the tenth transistor M10 is connected to the pull-up node PU, and the drain of the tenth transistor M10 is connected to the low-level signal terminal VGL. The gate of the eleventh transistor M11 is connected to the first pull-down node PD1, the source of the eleventh transistor M11 is connected to the signal output terminal OUTPUT, and the drain of the eleventh transistor M11 is connected to the low-level signal terminal VGL. The gate of the tenth transistor M10' is connected to the second pull-down node PD2, the source of the tenth transistor M10' is connected to the pull-up node PU, and the drain of the tenth transistor M10' is connected to the low-level signal terminal VGL. The gate of the eleventh transistor M11' is connected to the second pull-down node PD2, the source of the eleventh transistor M11' is connected to the signal output terminal OUTPUT, and the drain of the eleventh transistor M11' is connected to the low-level signal terminal VGL. The gate of the seventh transistor M7 is connected to the signal terminal STVO, the source of the seventh transistor M7 is connected to the pull-up node PU, and the drain of the seventh transistor M7 is connected to the low-level signal terminal VGL. The gate of the sixteenth transistor M16 is connected to the signal input terminal INPUT, the source of the sixteenth transistor M16 is connected to the first pull-down node PD1, and the drain of the sixteenth transistor M16 is connected to the low-level signal terminal VGL. The gate of the sixteenth transistor M16' is connected to the signal input terminal INPUT, the source of the sixteenth transistor M16' is connected to the second pull-down node PD2, and the drain of the sixteenth transistor M16' is connected to the low-level signal terminal VGL.

The fifth transistor M5 and the ninth transistor M9 constitute the first pull-down control sub-circuit, the fifth transistor M5' and the ninth transistor M9' constitute the second pull-down control sub-circuit, and the first pull-down control sub-circuit and the second pull-down control sub-circuit operate in a time-sharing manner, that is, operating in turns. The first noise reduction sub-circuit constituted by the tenth transistor M10 and the eleventh transistor M11 is controlled by the first pull-down control sub-circuit, the second noise reduction sub-circuit constituted by the tenth transistor M10' and the eleventh transistor M11' is controlled by the second pull-down control sub-circuit, and the first noise reduction sub-circuit and the second noise reduction sub-circuit also operate in a time-sharing manner.

The operation principles of the first pull-down control sub-circuit and the second pull-down control sub-circuit are the same, and the operation principles of the first noise reduction sub-circuit and the second noise reduction sub-circuit are the same. The operation principles of the shift register unit will be described below only during operation of the first pull-down control sub-circuit and the first noise reduction sub-circuit.

In a discharge stage, that is, before the display of one frame, a high-level signal is input to the signal terminal STVO, and the seventh transistor M7 is turned on. The pull-up node PU is discharged by the low-level signal input by the low-level signal terminal VGL, which prevents abnormal display caused by the residual charge of the pull-up node PU.

In an input stage, a high-level signal is input to the signal input terminal INPUT, and the first transistor M1 is turned on. The potential of the pull-up node PU is pulled up by a high-level signal, and the storage capacitor C is charged.

In an output stage, since the potential of the pull-up node PU is pulled high in the input stage, the third transistor M3 is turned on. The high-level signal input by the clock signal terminal CLK is output to a corresponding gate line through the signal output terminal OUTPUT.

In a reset stage, a high-level signal is input to the pull-up reset signal terminal RESET PU, and the second transistor M2 is turned on. The pull-up node PU is reset by pulling down the potential of the pull-up node PU by a low-level signal input by the low-level signal terminal VGL. Since the potential of the pull-up node PU is pulled down, the third transistor M3 is turned off, and the signal output terminal OUTPUT and the cascade signal output terminal OUT_C each no longer output a high-level signal. At the same time, the first pull-down control node PD CN1 and the first pull-down node PD1 each is of a high-level signal, and the tenth transistor M10 and the eleventh transistor M11 are turned on, thereby performing noise reduction on the pull-up node PU and the signal output terminal OUTPUT until the next frame starts and the potential of the pull-up node PU is pulled up again.

In some embodiments, as shown in FIG. 8, in order to reduce the load of the signal output terminal OUTPUT, the shift register is further provided with a cascade sub-circuit. In response to the potential of the pull-up node PU, the cascade sub-circuit outputs the clock signal input by the clock signal terminal CLK through the cascade signal output terminal OUT_C. A same signal is output by the cascade signal output terminal OUT_C and the signal output terminal OUTPUT. For example, the cascade signal output terminal OUT_C outputs a high-level signal to the pull-up reset signal terminal RESET PU of a shift register unit of a former stage, and the signal input terminal INPUT of a shift register unit of a latter stage. The cascade sub-circuit comprises a thirteenth transistor M13, the gate of the thirteenth transistor M13 is connected to the pull-up node PU, the source of the thirteenth transistor M13 is connected to the clock signal terminal CLK, and the drain of the thirteenth transistor M13 is connected to the cascade signal terminal OUT_C. In addition, the first noise reduction sub-circuit and the second noise reduction sub-circuit are also provided with a twelfth transistor, which is presented by M12 and M12' respectively. The twelfth transistor is configured to perform noise reduction on the signal output by the cascade signal output terminal OUT_C. The gate of the twelfth transistor M12 is connected to the first pull-down node PD1, the source of the twelfth transistor M12 is connected to the cascade signal output terminal OUT_C, and the drain of the twelfth transistor M12 is connected to the low-level signal terminal LVGL. The gate of the twelfth transistor M12' is connected to the second pull-down node PD2, the source of the twelfth transistor M12' is connected to the cascade signal output terminal OUT_C, and the drain of the twelfth transistor M12' is connected to the low-level signal terminal LVGL.

The load of the signal output terminal OUTPUT can be reduced by providing the cascade sub-circuit, which prevents the gate scanning signal output by the signal output terminal OUTPUT from being affected.

For the gate drive circuit using the above shift register unit, as shown in FIG. 8, the cascade signal output terminal OUT_C of the shift register unit of a stage is connected to the pull-up reset signal terminal RESET PU of a shift register of a former stage, and the signal input terminal INPUT of a shift register unit of a latter stage. It should be understood that, the above shift register unit may not be provided with the cascade sub-circuit, in this case, the signal output terminal OUTPUT of the shift register unit of the stage is connected to the pull-up reset signal terminal RESET PU of a shift register of a former stage, and the signal input terminal INPUT of a shift register unit of a latter stage.

In addition, compared to FIG. 7, in FIG. 8, the drains of the eleventh transistors M11 and M11' are connected to the low-level signal terminal VGL, and the drains of other transistors required to be connected to a low-level signal terminal are connected to the low-level signal terminal LVGL.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. An array substrate, comprising a first base substrate, a plurality of data lines, and a plurality of sub-pixels connected to the plurality of data lines, at least one of the plurality of sub-pixels comprising:
a first insulating layer located on one side of the first base substrate;
a gate located between the first base substrate and the first insulating layer;
an active layer located on one side of the first insulating layer away from the gate;
a pixel electrode located on one side of the first insulating layer away from the first base substrate;
a first electrode located on one side of both the active layer and the pixel electrode away from the first base substrate, wherein the first electrode is connected to the active layer and a surface of the first electrode close to the first base substrate is directly in contact with the pixel electrode, an end of the first electrode close to the pixel electrode being directly in contact with the pixel electrode;
a second electrode spaced apart from the first electrode, and connected to the active layer and a data line of the plurality of data lines;
a second insulating layer located on one side of the pixel electrode, the first electrode and the second electrode away from the first base substrate, the second insulating layer being in contact with the pixel electrode, and defining a first opening penetrating through second insulating layer, wherein an orthographic projection of the first opening on the first base substrate partially overlaps with an orthographic projection of the pixel electrode on the first base substrate, and partially overlaps with an orthographic projection of the first electrode on the first base substrate;
a connection electrode not integrated with the first electrode, and directly in contact with both the pixel electrode and the first electrode through the first opening, wherein the connection electrode is at least partially located in the first opening, a portion of a surface of the connection electrode close to the first base substrate is directly in contact with a surface of the first electrode away from the first base substrate, and another portion of the surface of the connection electrode close to the first base substrate is directly in contact with the pixel electrode; and
a common electrode located on one side of the second insulating layer away from the pixel electrode and spaced apart from the connection electrode, wherein the common electrode and the connection electrode are located in a same layer.

2. The array substrate according to claim 1, wherein common electrodes of a part of the plurality of sub-pixels are connected to each other, and common electrodes of remaining sub-pixels of the plurality of sub-pixels are spaced apart from each other.

3. The array substrate according to claim 2, wherein the plurality of sub-pixels comprises a plurality of columns of sub-pixels, the part of the sub-pixels comprises at least one column of sub-pixels of the plurality of columns of sub-pixels, each column of sub-pixels of the at least one column of sub-pixels comprises two adjacent sub-pixels, and two common electrodes of the two adjacent sub-pixels are connected through a common electrode connector.

4. The array substrate according to claim 3, wherein the plurality of sub-pixels comprises a plurality of rows of sub-pixels, and two gates of two adjacent sub-pixels in each row of sub-pixels of the plurality of rows of sub-pixels are connected through a gate connector, wherein the gate connector partially overlaps with the common electrode connector and the data line.

5. The array substrate according to claim 4, wherein the data line extends in a first direction and comprises:
a first data line portion not overlapping with the gate connector; and
a second data line portion adjacent to the first data line portion and partially overlapping with the gate connector, wherein a length of the second data line portion in a second direction perpendicular to the first direction is greater than a length of the first data line portion in the second direction.

6. The array substrate according to claim 5, wherein a ratio of the length of the second data line portion in the second direction to the length of the first data line portion in the second direction is greater than 1 and smaller than or equal to 1.4.

7. The array substrate according to claim 4, wherein the data line extends along a first direction, and an angle between an extending direction of the gate connector and the first direction is greater than or equal to 45 degrees and smaller than 90 degrees.

8. The array substrate according to claim 3, wherein:
the plurality of columns of sub-pixels comprises a plurality of columns of first sub-pixels configured to emit light of a first color, a plurality of columns of second sub-pixels configured to emit light of a second color, and a plurality of columns of third sub-pixels configured to emit light of a third color, two adjacent columns of third sub-pixels of the plurality of columns of third sub-pixels are spaced apart by one column of first sub-pixels of the plurality of columns of first sub-pixels and one column of second sub-pixels of the plurality of columns of second sub-pixels, and the first color, the second color and the third color are different from each other; and
the at least one column of sub-pixels comprises two or more columns of third sub-pixels of the plurality of columns of third sub-pixels.

9. The array substrate according to claim 8, wherein two adjacent rows of third sub-pixels in the two or more rows of third sub-pixels are spaced apart by one column of third sub-pixels other than the two or more columns of third sub-pixels of the plurality of columns of third sub-pixels.

10. The array substrate according to claim 3, wherein the two common electrodes are integrally provided with the common electrode connector.

11. The array substrate according to claim 1, wherein:
the plurality of sub-pixels comprises a plurality of rows of sub-pixels;
the array substrate further comprises a plurality of common voltage lines connected to the plurality of rows of sub-pixels, and each of the plurality of common voltage lines is configured to apply a common voltage to common electrodes of a corresponding row of sub-pixels of the plurality of rows of sub-pixels;
the second insulating layer of each sub-pixel in each row of sub-pixels of the plurality of rows of sub-pixels defines a second opening; and
the common electrode of each sub-pixel in each row of sub-pixels is in contact with a common voltage line of the plurality of common voltage lines corresponding to each row of sub-pixels and in contact with the first base substrate through the second opening.

12. The array substrate according to claim 11, wherein:
the common voltage line comprises a first common voltage line portion, a second common voltage line portion and a third common voltage line portion, the third common voltage line portion is located between the first common voltage line portion and the second common voltage line portion, the third common voltage line portion is adjacent to the first common voltage line portion and the second common voltage line portion respectively, a length of the second common voltage line portion in a first direction perpendicular to a second direction in which the common voltage line extends is greater than a length of the first common voltage line portion in the first direction, and the length of the first common voltage line portion in the first direction is greater than a length of the third common voltage line portion in the first direction; and
the common electrode is in contact with the second common voltage line portion through the second opening of the second insulating layer.

13. The array substrate according to claim 11, wherein the plurality of common voltage lines and the gate are located in a same layer.

14. The array substrate according to claim 1, wherein the common electrode comprises:
a first electrode portion having a slit, the first electrode portion being located on one side of the connection electrode away from the gate; and
a second electrode portion adjacent to the first electrode portion and not having a slit, the second electrode portion being located on one side of the connection electrode away from the data line.

15. A display device, comprising the array substrate according to claim 1.

16. The display device according to claim 15, further comprising a color filter substrate arranged opposite to the array substrate, the color filter substrate comprising:
a second base substrate;
a black matrix and a light filter layer which are located on one side of the second base substrate close to the array substrate, wherein the light filter layer comprises a plurality of light filter units, and adjacent light filter units of the plurality of light filter units are spaced apart by the black matrix;
a planarization layer located on one side of the black matrix and the light filter layer close to the array substrate; and
a plurality of spacers located between the planarization layer and the array substrate, wherein an orthographic projection of each of the plurality of spacers on the second base substrate is located within an orthographic projection of the black matrix on the second base substrate.

17. The display device according to claim 16, wherein:
the plurality of sub-pixels comprises a plurality of columns of first sub-pixels configured to emit light of a first color, a plurality of columns of second sub-pixels configured to emit light of a second color, and a plurality of columns of third sub-pixels configured to emit light of a third color and the first color, the second color and the third color are different from each other; and
a region of each first sub-pixel of the plurality of columns of first sub-pixels, a region of each second sub-pixel of the plurality of columns of second sub-pixels and a region of each third sub-pixel of the plurality of columns of third sub-pixels not covered by the black matrix each is a light-emitting region, and an area of the light-emitting region of each second sub-pixel is smaller than an area of the light-emitting region of each first sub-pixel and an area of the light-emitting region of each third sub-pixel.

18. The display device according to claim 17, wherein a second sub-pixel of the plurality of columns of second sub-pixels further comprises a plurality of blocking portions, and an orthographic projection of each of the plurality of blocking portions is located within the orthographic projection of the black matrix on the first base substrate, the plurality of blocking portions comprising:

a first blocking portion located on one side of one of the plurality of spacers corresponding to the second sub-pixel close to the pixel electrode;

a second blocking portion located on one side of the first blocking portion away from the one of the plurality of spacers, wherein a height of the second blocking portion is greater than a height of the first blocking portion; and a third blocking portion located on a second side of the light-emitting region, wherein the second side is opposite to the first side, wherein a region of the second sub-pixel not covered by the black matrix is a light-emitting region, and the first blocking portion and the second blocking portion are located on a first side of the light-emitting region.

19. The display device according to claim 18, wherein:

the first blocking portion comprises a first layer, a second layer, a third layer, a fourth layer and a fifth layer sequentially arranged on the one side of the first base substrate;

at least one of the second blocking portion or the third blocking portion comprises a sixth layer, a seventh layer, an eighth layer, a ninth layer, a tenth layer and an eleventh layer sequentially arranged on the one side of the first base substrate; and the first layer, the seventh layer and the first insulating layer are located in a same layer, the second layer, the eighth layer and the pixel electrode are located in a same layer, the third layer, the ninth layer and the first electrode are located in a same layer, the fourth layer, the tenth layer and the second insulating layer are located in a same layer, the fifth layer, the eleventh layer and the common electrode are located in a same layer, and the sixth layer and the gate are located in a same layer.

20. A manufacturing method of an array substrate, comprising forming a plurality of data lines and a plurality of sub-pixels on one side of a first base substrate, wherein forming at least one of the plurality of sub-pixels comprises:

forming a gate on the one side of the first base substrate;

forming a first insulating layer on one side of the gate away from the first base substrate;

forming an active layer on one side of the first insulating layer away from the gate;

forming a pixel electrode on one side of the first insulating layer away from the first base substrate;

forming a first electrode and a second electrode, wherein the first electrode is located on one side of both the active layer and the pixel electrode away from the first base substrate, and connected to the active layer, and a surface of the first electrode close to the first base substrate is directly in contact with the pixel electrode, and the second electrode is spaced apart from the first electrode and connected to the active layer and a data line of the plurality of data line, an end of the first electrode close to the pixel electrode being directly in contact with the pixel electrode;

forming a second insulating layer on one side of the pixel electrode, the first electrode and the second electrode away from the first base substrate, wherein the second insulating layer is in contact with the pixel electrode and defines a first opening penetrating through second insulating layer, an orthographic projection of the first opening on the first base substrate partially overlaps with an orthographic projection of the pixel electrode on the first base substrate, and partially overlaps with an orthographic projection of the first electrode on the first base substrate; and forming a connection electrode not integrated with the first electrode and a common electrode spaced apart from the connection electrode, wherein the connection electrode is directly in contact with both the pixel electrode and the first electrode through the first opening, the connection electrode is at least partially located in the first opening a portion of a surface of the connection electrode close to the first base substrate is directly in contact with a surface of the first electrode away from the first base substrate, another portion of the surface of the connection electrode close to the first base substrate is directly in contact with the pixel electrode, the common electrode is located on one side of the second insulating layer away from the pixel electrode and the common electrode and the connection electrode are located in a same layer.

* * * * *